(12) United States Patent
Sugimoto

(10) Patent No.: US 8,743,410 B2
(45) Date of Patent: Jun. 3, 2014

(54) METHOD, APPARATUS, AND PROGRAM FOR LAYING OUT IMAGES

(75) Inventor: Mika Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1849 days.

(21) Appl. No.: 11/519,926

(22) Filed: Sep. 13, 2006

(65) Prior Publication Data

US 2007/0064278 A1 Mar. 22, 2007

(30) Foreign Application Priority Data

Sep. 16, 2005 (JP) ................................ 2005-270071

(51) Int. Cl.
*H04N 1/387* (2006.01)

(52) U.S. Cl.
USPC .......... 358/1.18; 358/451; 358/1.1; 358/1.15; 358/453

(58) Field of Classification Search
USPC ........... 358/453, 451, 1.1, 1.15, 1.2; 382/284, 382/294, 302
See application file for complete search history.

(56) References Cited

U.S. PATENT DOCUMENTS

| 7,529,429 | B2 * | 5/2009 | Rother et al. | 382/284 |
|---|---|---|---|---|
| 2004/0036892 | A1 * | 2/2004 | Ito et al. | 358/1.2 |
| 2005/0024681 | A1 * | 2/2005 | Tehrani et al. | 358/1.18 |
| 2006/0171004 | A1 * | 8/2006 | Hori | 358/540 |

FOREIGN PATENT DOCUMENTS

| EP | 1 005 220 A2 | 5/2000 |
|---|---|---|
| JP | 11-250223 A | 9/1999 |
| JP | 11-341272 A | 12/1999 |
| JP | 2000-270198 A | 9/2000 |
| JP | 2000-270199 A | 9/2000 |
| JP | 2005-117492 A | 4/2005 |

OTHER PUBLICATIONS

Office Action issed on Jun. 8, 2010 in Japanese Application No. 2005-270071.

\* cited by examiner

*Primary Examiner* — King Poon
*Assistant Examiner* — Iriana Cruz
(74) *Attorney, Agent, or Firm* — Birch, Stewart, Kolasch & Birch, LLP

(57) ABSTRACT

Images are laid out appropriately according to the sizes of faces of people pictured therein. A user selects a plurality of images to be laid out on a single background image. A layout determining section selects a template having the same number of image insertion regions as the number of images selected by the user, from among a plurality of templates, each having one or more image insertion regions of various sizes. Whether faces are included in the images is judged. Image layout is determined such that images that include faces are inserted in image insertion regions of the template having greater sizes as the size of a representative face is smaller; and images that do not include faces are inserted into image insertion regions of the template having smaller sizes.

5 Claims, 5 Drawing Sheets

| NUMBER OF IMAGES | TEMPLATE ID |
|---|---|
| 1 | 001 |
| 2 | 002 |
| 3 | 003 |
| 4 | 004 |
| ⋮ | ⋮ |
| 13 | 013 |
| 14 | 014 |
| 15 | 015 |
| ⋮ | ⋮ |

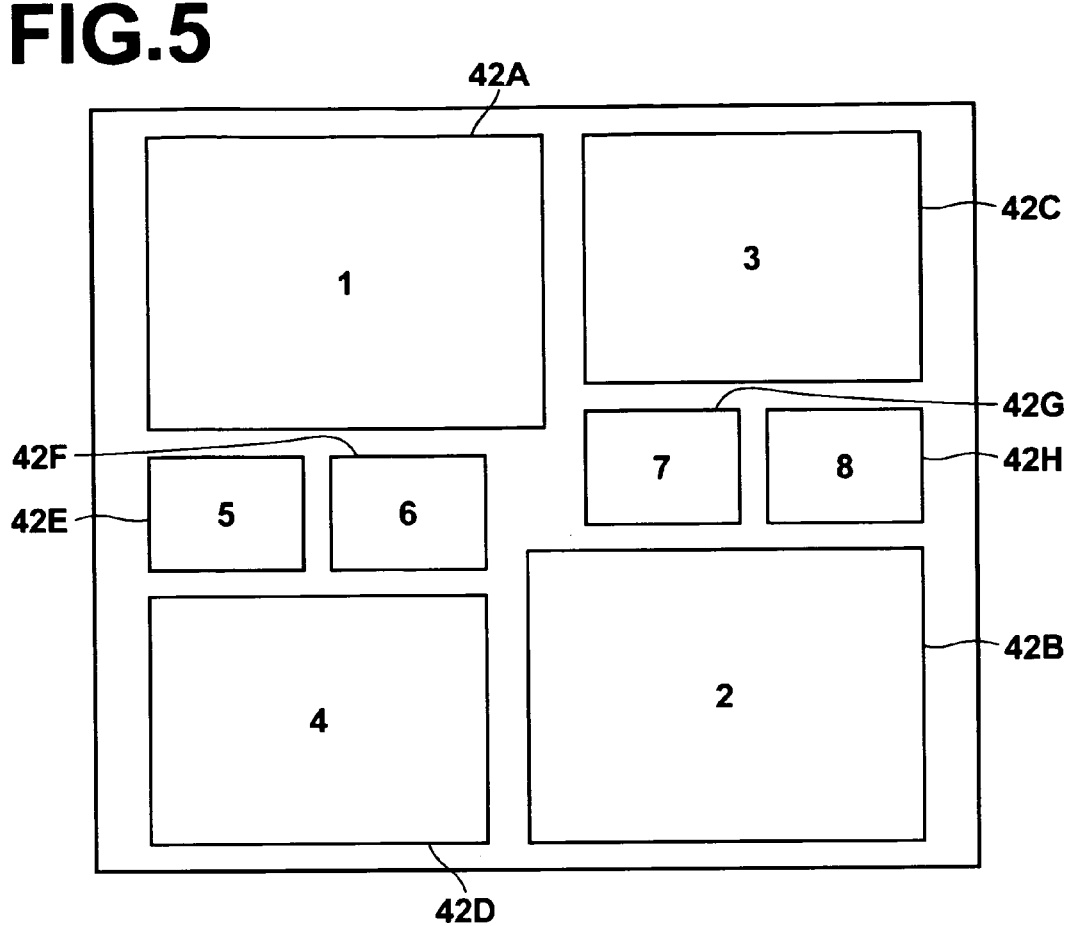

METHOD, APPARATUS, AND PROGRAM FOR LAYING OUT IMAGES

BACKGROUND OF THE INVENTION

1. Field of the Invention

The present invention relates to a method, an apparatus, and a program for laying out a plurality of images on a single background image.

2. Description of the Related Art

The positions of people who are pictured within images are very important, in images that include people as subjects. Particularly for ID photos such as those employed for passports and the like, it is necessary to photograph a face of a predetermined size, at a predetermined position, within an image of a predetermined size. For this reason, techniques for extracting faces from images, trimming the images and changing the sizes thereof such that the faces are of a predetermined size and at a predetermined position within the images have been proposed (refer to Japanese Unexamined Patent Publication Nos. 11(1999)-341272, 2000-270198, and 2000-270199).

A technique for generating photo albums, such as yearbooks, has also been proposed in European Patent Application Publication No. 1005220. In this technique, facial regions are extracted from images obtained by photographing people. The extracted facial regions are normalized and pasted onto a single background. According to this technique, the sizes of facial images of a plurality of people who are included in the photo album can be uniformized, and therefore, attractive albums can be generated.

However, there are cases in which not one but a plurality of people are pictured when images are obtained by photography during a trip, an athletic event, and the like. In these cases, the faces pictured within a single image are smaller compared to cases in which a single person is included in an image. In addition, in the case that images are obtained by photographing people in front of a scenic background, the main subject is not the people but the landscape. Therefore, the sizes of the people's faces tend to be extremely small in these images. For these reasons, if images, in which the faces of people pictured therein are small, are laid out onto a single background, if the sizes of the faces are normalized as in the case of the aforementioned ID photos or photo albums, it becomes necessary to greatly enlarge the images. In addition, if portions that people are pictured in within the enlarged images are trimmed, the mood of the image is greatly lost. Particularly in the case that the main subject of an image is the background, the faces of people pictured therein are extremely small. Therefore, if the sizes of the faces are normalized and the image is trimmed about the facial regions, almost none of the background will be included in the trimmed image, which causes the image to be completely different from that which the photographer intended. In addition, there are cases in which image insertion regions of the background image, into which the images are to be laid out, vary in size. In these cases, if an image, in which faces of people are pictured small, is inserted into a small image insertion region, it becomes necessary to reduce the image size. Accordingly, it becomes difficult to discern who is pictured in the image.

SUMMARY OF THE INVENTION

The present invention has been developed in view of the foregoing circumstances. It is an object of the present invention to provide a method, an apparatus, and a program for laying out images which is capable of appropriately laying out images according to the sizes of the faces of people pictured therein.

An image layout apparatus according to the present invention comprises:

image selecting means, for selecting a plurality of images to be laid out on a single background image; and layout determining means, for determining the layout of the images by:

selecting a template having the same number of image insertion regions as the number of images selected by the image selecting means, from among a plurality of templates, each having one or more image insertion regions of various sizes;

judging whether faces are included in the images;

inserting images that include faces in image insertion regions of the template having greater sizes as the size of a representative face is smaller; and inserting images that do not include faces into image insertion regions of the template having smaller sizes.

In the case that an image includes a single face, the "representative face" is the single face. In the case that an image includes a plurality of faces, the "representative face" is the largest face from among the plurality of faces.

A configuration may be adopted, wherein:

the order of insertion of images into the image insertion regions of the templates is defined in order from the largest image insertion region to the smallest image insertion region; and the layout determining means determines the image layout of the plurality of images by determining the order of images to be inserted such that images including the smallest faces are inserted first.

An image layout method according to the present invention comprises the steps of:

selecting a plurality of images to be laid out on a single background image;

selecting a template having the same number of image insertion regions as the number of images selected by the image selecting means, from among a plurality of templates, each having one or more image insertion regions of various sizes;

judging whether faces are included in the images;

inserting images that include faces in image insertion regions of the template having greater sizes as the size of a representative face is smaller; and inserting images that do not include faces into image insertion regions of the template having smaller sizes.

Note that the image layout method of the present invention may be provided in the form of a program that causes a computer to execute the method.

Note also that the program of the present invention may be provided being recorded on a computer readable medium. Those who are skilled in the art would know that computer readable media are not limited to any specific type of device, and include, but are not limited to: floppy disks. CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

According to the present invention, a plurality of images to be laid out on a single background image are selected. Then, a template having the same number of image insertion regions as the number of selected images is selected. Thereafter, whether faces are included in the images is judged, and image layout is determined such that images that include faces are inserted in image insertion regions of the template having greater sizes as the size of a representative face is smaller. Meanwhile, images that do not include faces are inserted into image insertion regions of the template having smaller sizes. Thereby, images, in which the sizes of faces pictured therein are small, are inserted into larger image insertion regions. Accordingly, difficulties in discerning who is pictured in the image can be prevented. In addition, because the sizes of faces are not normalized, in the case that the main subject of an image is the background, and the sizes of faces of people pictured therein are small, the image can be arranged such that it is obvious that the background is the main subject. Note that images, in which the sizes of faces pictured therein are large, are inserted into smaller image insertion regions. However, because the sizes of the faces are large, difficulties in discerning who is pictured can be prevented, even if the image insertion regions are small. Accordingly, images can be laid out appropriately according to the sizes of faces pictured therein.

BRIEF DESCRIPTION OF THE DRAWINGS

FIG. 5 illustrates an example of a selected template.

FIG. 6 illustrates an example of an insertion order list.

BEST MODE FOR CARRYING OUT THE INVENTION

Figure 1:
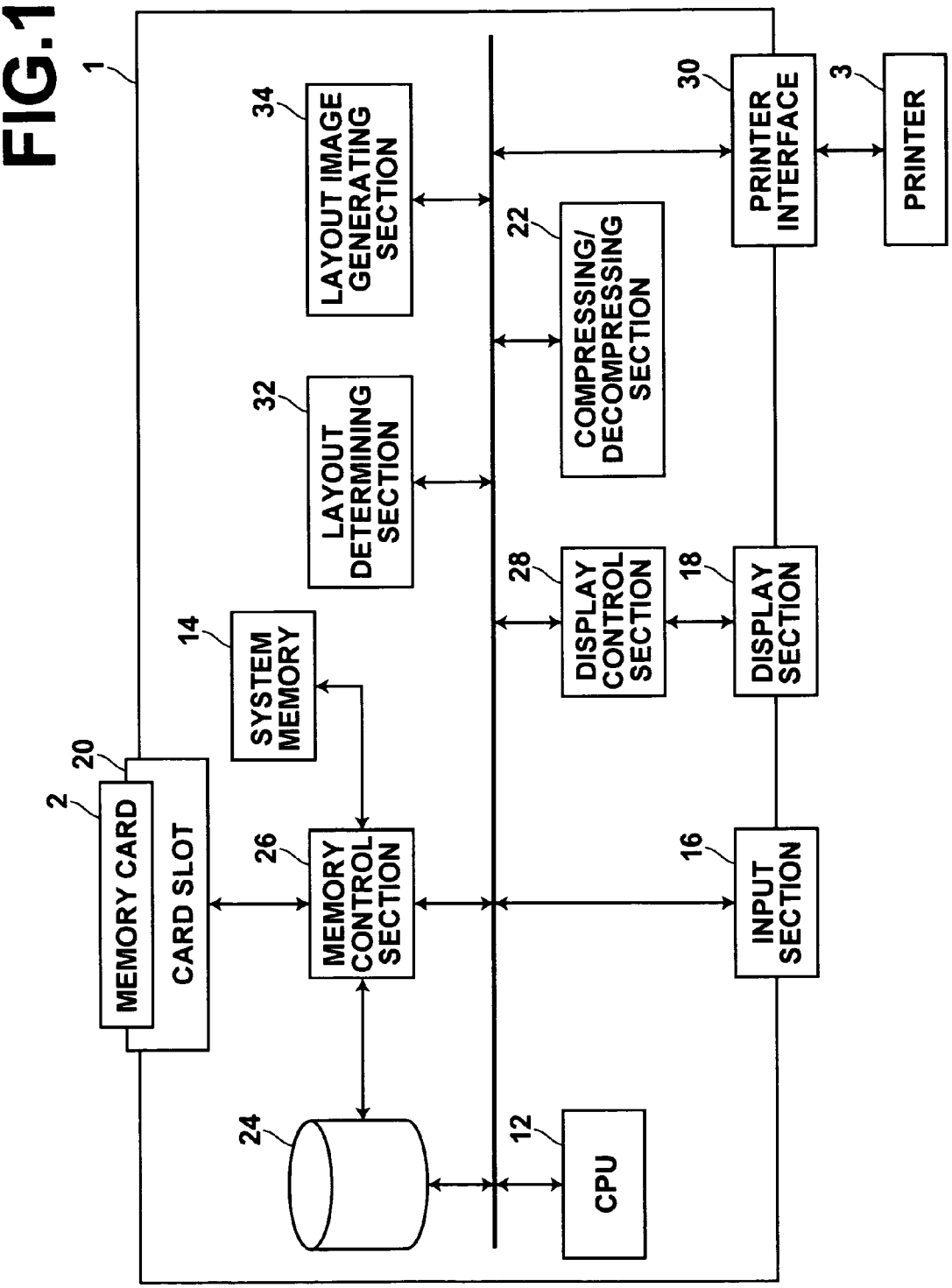
FIG. 1 is a block diagram that illustrates the schematic configuration of an image layout apparatus according to an embodiment of the present invention.

Hereinafter, an embodiment of the present invention will be described with reference to the attached drawings. FIG. 1 is a block diagram that illustrates the schematic configuration of an image layout apparatus 1 according to an embodiment of the present invention. As illustrated in FIG. 1, the image layout apparatus 1 comprises: a CPU 12, for controlling recording, display, and other aspects of image data sets that represent images; a system memory 14 that includes a ROM, in which programs for operating the apparatus 1 and various constants are recorded, and a RAM, which becomes a workspace when the CPU executes processes; an input section 16 constituted by a keyboard and a mouse, for example, for issuing commands to the apparatus 1; and a display section 18, constituted by an LCD monitor or the like.

The image layout apparatus 1 further comprises: a card slot 20, for reading image data sets out of a memory card 2 in which image data sets are recorded and for recording image data sets into the memory card 2; a compressing/decompressing section 22, for compressing image data sets in formats such as JPEG and for decompressing compressed image data sets; a hard disk 24, in which template data sets that represent background templates into which a plurality of images are laid out in, and programs to be executed by the CPU such as viewer software for viewing images, are recorded; a memory control section 26, for controlling the system memory 14, the card slot 20, and the hard disk 24; a display control section 28, for controlling display by the display section 18; and a printer interface 30, for connecting a printer 3 to the image layout apparatus 1.

The image layout apparatus 1 still further comprises: a layout determining section 32, for determining the layout of images to be inserted into a template; and a layout image generating section 34, for laying out images according to the layout determined by the layout determining section 32 to generate a laid out image.

Hereinafter, the functions of the layout determining section 32 and the layout image generating section 34 will be described in combination with processes which are performed by the apparatus 1 of the present embodiment.

Figure 2:
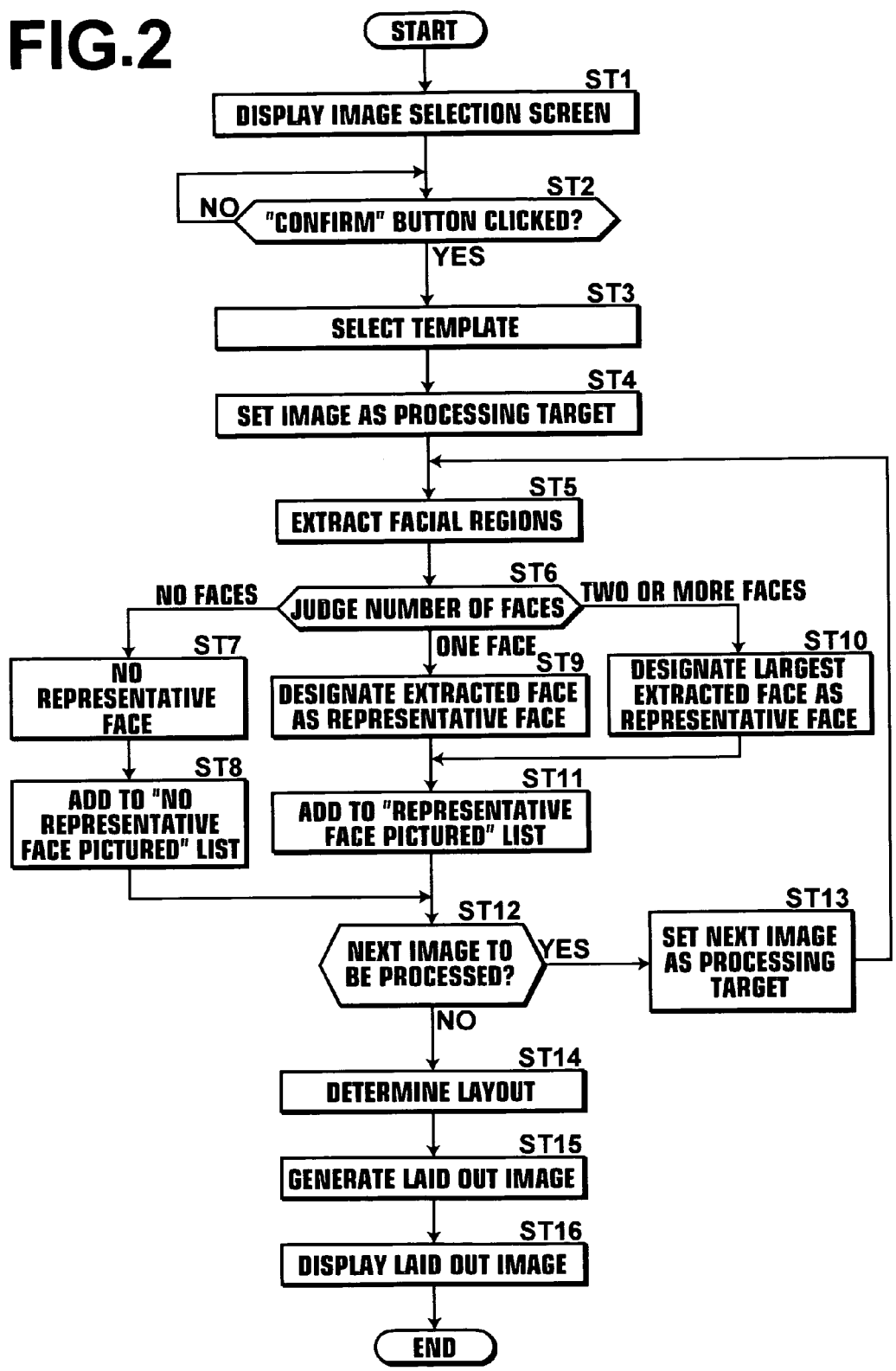
FIG. 2 is a flow chart that illustrates the processes performed by the image layout apparatus of FIG. 1.
Figures 3, 4:
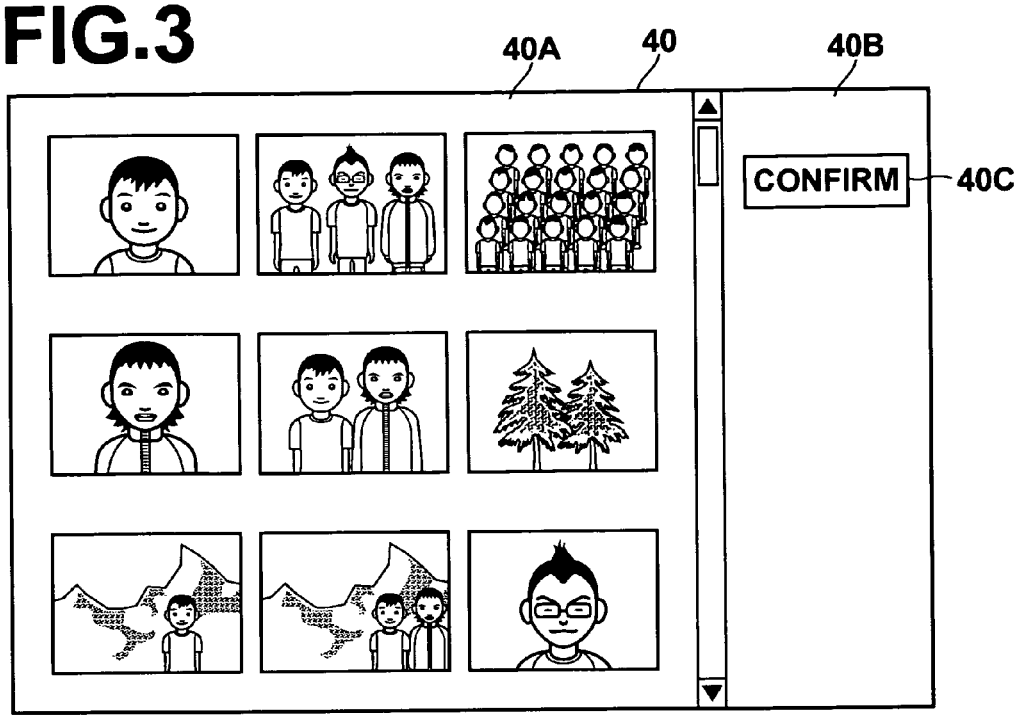
FIG. 3 illustrates an example of an image selection screen.
FIG. 4 illustrates an example of a template management database.

FIG. 2 is a flow chart that illustrates the processes performed by the apparatus 1 of the present embodiment. The CPU 12 initiates processing when a user inputs a layout command from the input section 16. First, an image selection screen, including thumbnail images of images which are stored in the hard disk 24, is displayed at the display section 18 (step ST1). FIG. 3 illustrates an example of the image selection screen. As illustrated in FIG. 3, the image selection screen comprises: a thumbnail image area 40A, in which thumb nail images of images stored in the hard disk 24 are displayed; and an input area 40B, for performing various types of input. A "CONFIRM" button 40C, for confirming the images to be laid out, is displayed in the input area 40B.

The user is enabled to select a plurality of images to be laid out from the image selection screen, by use of the input section 16. Specifically, the images to be laid out can be selected by clicking on desired images within the thumbnail image area 40A.

Next, monitoring is initiated to determine whether the user has clicked the "CONFIRM" button 40C to indicate that they have selected images to be laid out (step ST2). When the "CONFIRM" button 40C is clicked, the layout determining section 32 selects a template that corresponds to the number of selected images from among the plurality of templates which are stored in the hard disk 24 (step S3).

In the present embodiment, a template management database DB1 is stored in the hard disk 24. The template management database DB1 correlates numbers of images with template ID's of templates that have corresponding numbers of image insertion regions. FIG. 4 illustrates an example of the template management database DB1. As illustrated in FIG. 4, numbers of images and template ID's of template data sets that have corresponding numbers of image insertion regions are correlated with each other in the template management database DB1. Note that numerical values which are included in the file names of the template data sets may be employed as the template ID's.

After it is judged that the user has clicked the "CONFIRM" button 40C in step ST2, the layout determining means refers to the template database DB1, and selects a template ID corresponding to the number of images selected by the user. Then, a template is selected by reading out the template data set, which is specified by the template ID, from the hard disk 24. For example, in the case that the user has selected eight images, a template that has eight image insertion regions of various sizes, such as that illustrated in FIG. 5, is selected. In the present embodiment, the order of insertion of images into the image insertion regions of the templates is defined. Specifically, the order of insertion is defined to be from the largest image insertion region to the smallest image insertion region. For example, in the template illustrated in FIG. 5, the upper left image insertion region 42A and the lower right image insertion region 42B are the two largest image insertion regions. Therefore, insertion orders 1st and 2nd are assigned to these image insertion regions, respectively. The next largest image insertion regions 42C and 42D are assigned insertion orders 3rd and 4th. Note that in the case that the sizes of a plurality of image insertion regions are equal, orders may be assigned among them as appropriate. In the example of FIG. 5, the sizes of image insertion regions 42E, 42F, 42G, and 42H are equal, and insertion orders 5th through 8th are assigned among them randomly.

Next, the first image from among the plurality of selected images sorted by file name or the like is designated as a target of processing (step ST4), and subjected to a face detecting process to extract facial regions therefrom (step ST5). Note that skin colored regions in the shape of a human face (oval, for example) may be detected from the image and extracted as facial regions, as a method of extracting facial regions. Alternatively, the facial region extracting methods disclosed in Japanese Unexamined Patent Publication Nos. 8(1996)-153187, 9(1997)-050528, 2001-014474, 2001-175868, and 2001-209795 or other known methods may be employed.

Thereafter, the layout determining section 32 judges the number of extracted faces (step ST6). In the case that it is judged that the image does not include a face, that is, the number of extracted faces is 0, the image is designated as one that does not have a representative face (step ST7). Then, the file name of the processing target image is added to a "no representative face pictured" list, of insertion order lists that define the order that images are to be inserted into the image insertion regions of the template (step ST8). The insertion order lists will be described in detail later.

Meanwhile, in the case that the number of extracted facial regions is 1, the face of the extracted facial region is designated to be the representative face (step ST9), and in the case that the number of extracted facial regions is two or more, the face of the largest extracted facial region is designated to be the representative face (step ST10). Then, the image is added to a "representative face pictured" list of the insertion order lists such that it is higher on the list as the size of the representative face is smaller (step ST11).

Next, judged whether there are images remaining to be processed is judged (step ST12). In the case that the judgment in step ST12 is affirmative, a next image is designated to be the processing target image (step ST13), the process returns to step ST5, and steps ST5 and thereafter are repeated.

In the case that the judgment in step ST12 is negative, the "no representative face pictured" list is added to the end of the "representative face pictured" list to complete the insertion order list, thereby determining the layout of the images (step ST14). FIG. 6 illustrates an example of the insertion order list. As illustrated in FIG. 6, the insertion order list L0 comprises the "representative face pictured" list L1 and the "no representative face pictured" list L2. The "no representative face pictured" list is added to the end of the "representative face pictured" list by the process of step ST14. File names of images selected by the user are listed in ascending order of size of the representative faces therein in the "representative face pictured" list L1. File names of images that do not have faces pictured therein are listed in order of file name in the "no representative face pictured" list L2.

Note that in the present example, six of the eight images selected by the user include faces, and two do not. Therefore, the file names of six images are listed in the "representative face pictured" list in ascending order of the size of the representative face, and the file names of two images are listed in the "no representative face pictured" list in order of file name.

Here, the file names "DSCF0013.jpg", "DSCF0002.jpg", "DSCF0054.jpg", "DSCF0005.jpg", "DSCF0023.jpg", and "DSCF0012.jpg" are listed in this order in the "representative face pictured" list. Therefore, the size of the representative face pictured in the image having the file name "DSCF0013.jpg" is the smallest, and the size of the representative face pictured in the image having the file name "DSCF0012.jpg" is the largest.

Thereafter, the layout image generating section 34 refers to the insertion order list L0, and inserts images into the image insertion regions of the template in the order that the file names of the images are listed, thereby generating a laid out image (step ST15). The laid out image is displayed by the display section 18 (step S16), and the process ends. Note that the laid out image may be output as a print by the printer 3.

Figure 7:
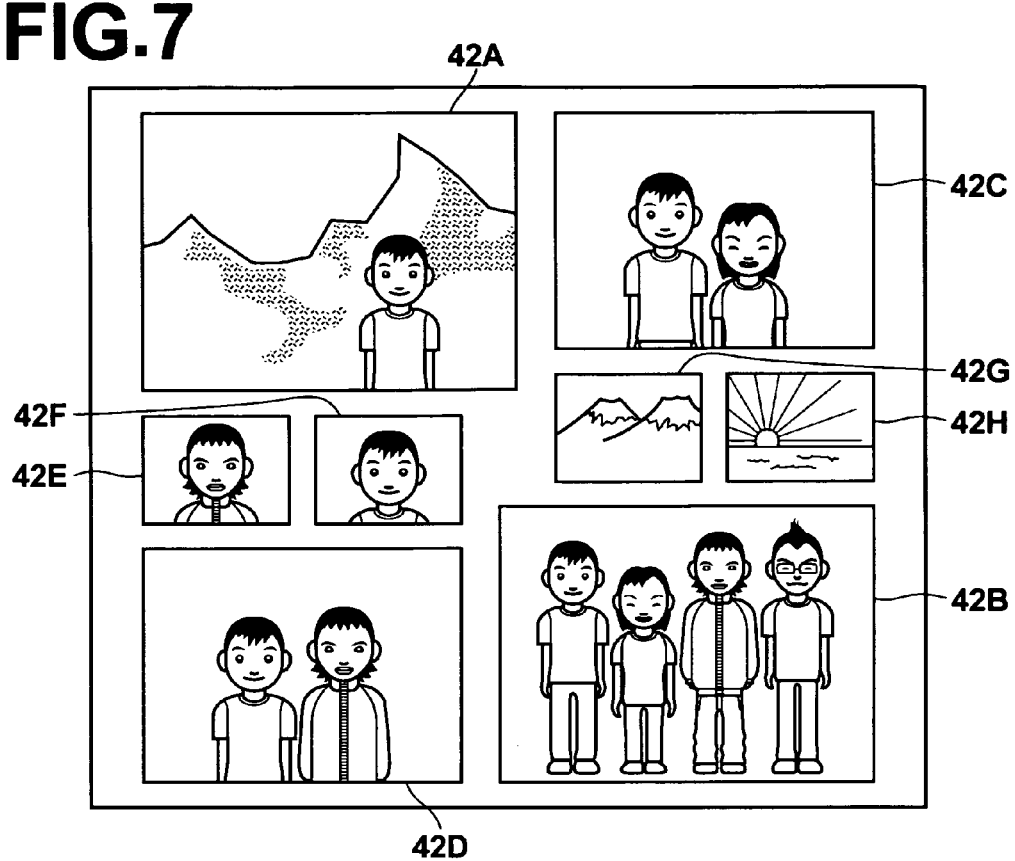
FIG. 7 illustrates an example of a laid out image.

FIG. 7 illustrates an example of a laid out image. As illustrated in FIG. 7, images are inserted within the image insertion regions 42A through 42F in order such that the relative sizes of the faces pictured therein start at the smallest and become larger. Images in which people are not pictured are inserted into the image insertion regions 42G and 42H.

In the present embodiment, image layout is determined such that images that include faces are inserted in image insertion regions of the template having greater sizes as the size of a representative face is smaller. Thereby, images, in which the sizes of faces pictured therein are small, are inserted into larger image insertion regions. Accordingly, difficulties in discerning who is pictured in the image can be prevented. In addition, because the sizes of faces are not normalized, in the case that the main subject of an image is the background, and the sizes of faces of people pictured therein are small, the image can be arranged such that it is obvious that the background is the main subject. Note that images, in which the sizes of faces pictured therein are large, are inserted into smaller image insertion regions. However, because the sizes of the faces are large, difficulties in discerning who is pictured can be prevented, even if the image insertion regions are small. Accordingly, images can be laid out appropriately according to the sizes of faces pictured therein.

Figure 8:
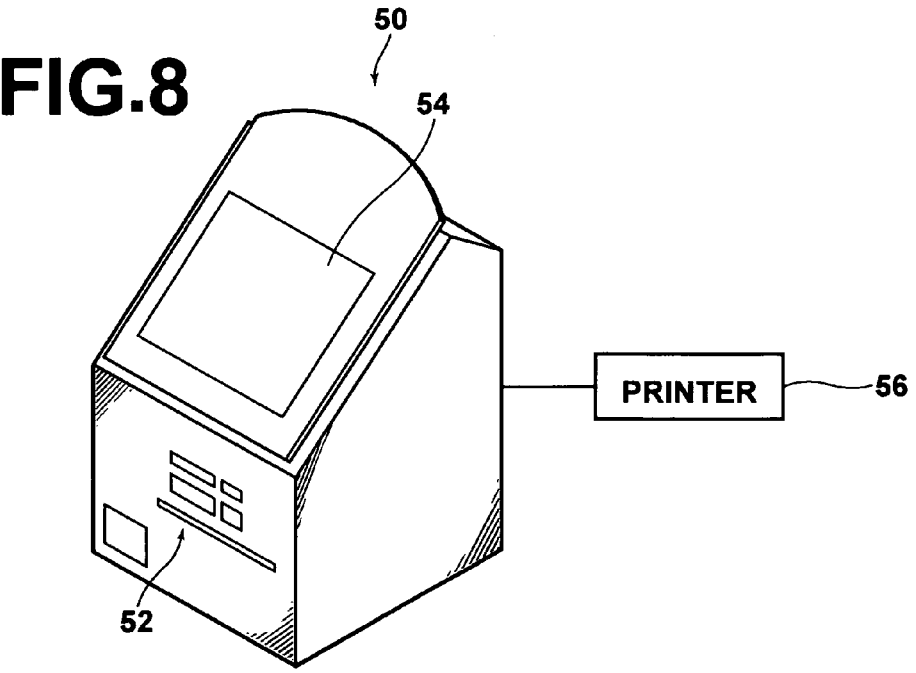
FIG. 8 is a diagram that illustrates an order reception apparatus in which the image layout apparatus according to the present invention is incorporated.

Note that in the embodiment described above, the image layout apparatus 1 is employed in a stand alone manner. Alternatively, it is possible to apply the image layout apparatus 1 to an order reception apparatus 50 which is installed at a DPE store, as illustrated in FIG. 8. In this case, users can load a memory card into a memory card slot 52 provided in the order reception apparatus 50, and select a plurality of images to be laid out from among images which are recorded in the memory card. Note that a monitor 54 of the order reception apparatus 50 comprises a touch panel type input section, and commands such as image selection are enabled to be input by touching the monitor 54.

The order reception apparatus 50 performs the same processes as those described above, generates a laid out image, and displays the generated laid out image on the monitor 54. Then, the users are enabled to input a print command to the order reception apparatus 50 to have a printer 56 connected thereto output the laid out image as a print.

Note that in the embodiment described above, the order of insertion of images into the image insertion regions of the templates is defined in order from the largest image insertion region to the smallest image insertion region, and the image layout is determined such that images including the smallest faces are inserted first. Alternatively, the order of insertion of images into the image insertion regions of the templates may be defined in order from the smallest image insertion region to the largest image insertion region. In this case, image layout is determined such that images including the largest faces are inserted first.

An image layout apparatus according to an embodiment of the present invention has been described above. A program that causes a computer to function as the layout determining section 32 and the layout image generating section 34 and to execute the processes illustrated in FIG. 2 is also an embodiment of the present invention. In addition, a computer readable medium having such a program recorded therein is also an embodiment of the present invention.

What is claimed is:

1. An image layout apparatus, comprising:
    image selecting means, for selecting a plurality of images to be laid out on a single background image; and
    layout determining means, for determining the layout of the images by:
        selecting, automatically, a template having the same number of image insertion regions as the number of images selected by the image selecting means, from among a plurality of templates, each having one or more image insertion regions of various sizes;
        judging whether faces are included in the images;
        inserting images that include faces in image insertion regions of the template having greater sizes as the size of a representative face is smaller, such that difficulties in discerning who is pictured in the image can be prevented;
        inserting images that include faces in image insertion regions of the template having smaller sizes as the size of a representative face is larger; and
        inserting images that do not include faces into image insertion regions of the template having smaller sizes.

2. An image layout apparatus as defined in claim 1, wherein:
    the order of insertion of images into the image insertion regions of the templates is defined in order from the largest image insertion region to the smallest image insertion region; and
    the layout determining means determines the image layout of the plurality of images by determining the order of images to be inserted such that images including the smallest faces are inserted first.

3. An image layout apparatus as defined in claim 1, wherein:
    the layout determining means selects a template, by referring to a template database, in which number of image insertion regions of templates is correlated with the number of images to be inserted.

4. An image layout method, comprising the steps of:
    selecting a plurality of images to be laid out on a single background image;
    selecting, automatically, a template having the same number of image insertion regions as the number of the selected images, from among a plurality of templates, each having one or more image insertion regions of various sizes;
    judging whether faces are included in the images;
    inserting images that include faces in image insertion regions of the template having greater sizes as the size of a representative face is smaller, such that difficulties in discerning who is pictured in the image can be prevented;
    inserting images that include faces in image insertion regions of the template having smaller sizes as the size of a representative face is larger; and
    inserting images that do not include faces into image insertion regions of the template having smaller sizes.

5. A non-transitory computer readable medium having recorded therein a program that causes a computer to execute an image layout method, comprising the procedures of:
    selecting a plurality of images to be laid out on a single background image;
    selecting, automatically, a template having the same number of image insertion regions as the number of the selected images, from among a plurality of templates, each having one or more image insertion regions of various sizes;
    judging whether faces are included in the images;
    inserting images that include faces in image insertion regions of the template having greater sizes as the size of a representative face is smaller, such that difficulties in discerning who is pictured in the image can be prevented;
    inserting images that include faces in image insertion regions of the template having smaller sizes as the size of a representative face is larger; and
    inserting images that do not include faces into image insertion regions of the template having smaller sizes.

* * * * *